United States Patent [19]

Jacob

[11] Patent Number: 4,764,153
[45] Date of Patent: Aug. 16, 1988

[54] BEARING ASSEMBLY FOR THE DRIVEN WHEELS OF A MOTOR VEHICLE HAVING A SPLIT INNER BEARING RING

[76] Inventor: Werner Jacob, Briandring 28, 6000 Frankfurt/M. 70, Fed. Rep. of Germany

[21] Appl. No.: 25,877

[22] Filed: Mar. 16, 1987

[30] Foreign Application Priority Data

Mar. 15, 1986 [DE] Fed. Rep. of Germany ....... 3608728

[51] Int. Cl.$^4$ .................. B60B 27/02; F16C 33/58
[52] U.S. Cl. .................. 464/111; 301/105 R; 384/503; 384/504; 384/506; 384/544; 464/178; 464/905
[58] Field of Search ............... 180/254, 256; 301/6 R, 301/6 D, 105 R; 384/499, 502, 503, 504, 505, 506, 544; 464/111, 178, 905

[56] References Cited

U.S. PATENT DOCUMENTS

| | | | |
|---|---|---|---|
| 1,373,139 | 3/1921 | Lindman | 384/506 X |
| 4,433,877 | 2/1984 | Colanzi | 384/544 |
| 4,487,593 | 12/1984 | Welschof | 464/111 |

FOREIGN PATENT DOCUMENTS

| | | | |
|---|---|---|---|
| 2499910 | 8/1982 | France | 301/105 R |
| 2556286 | 6/1985 | France | 180/254 |

*Primary Examiner*—Daniel P. Stodola
*Attorney, Agent, or Firm*—Toren, McGeady & Associates

[57] ABSTRACT

A wheel bearing assembly, wherein a wheel bearing including an inner bearing ring and an outer bearing ring is arranged in driving connection with a universal joint, is formed with the inner bearing ring consisting of a piece which has been initially formed as a unitary member with dimensions so as to be ready for installation in the bearing assembly, with the unitary member being subsequently ruptured to form a split therein by application of pressure, thereby to form the inner bearing ring in two parts. The wheel bearing consists of a dual-row ball bearing and the inner bearing ring is formed with two races, with the split extending between the two races. A recess is formed between the two parts of the inner bearing within which there engages part of the universal joint to effect torque transmitting engagement between the joint and the wheel assembly, with the two parts of the inner bearing ring being clamped together within an assembled state, with the split therebetween extending through the recess.

8 Claims, 2 Drawing Sheets

BEARING ASSEMBLY FOR THE DRIVEN WHEELS OF A MOTOR VEHICLE HAVING A SPLIT INNER BEARING RING

The present invention relates generally to a bearing arrangement for the driven wheels of motor vehicles and, more particularly, to a dual-row ball bearing device able to carry both radial and axial loads. Bearing arrangements of the type to which the present invention relates generally comprise angular contact ball bearings having a two-piece inner bearing ring with each of its two parts defining, respectively, one race for the rolling members of a dual-race bearing. One part of the inner ring is connected to form an integral part of a flange serving for attachment of the wheel of a vehicle. The wheel bearing device is rotationally connected with a constant velocity universal joint provided for driving the flange, and an undivided outer bearing ring is provided for attachment at a wheel carrier of a vehicle.

Bearing arrangements are known, for instance, in which the inner bearing ring is designed in one piece. In addition, the inner bearing ring is designed to form an integral part with the wheel flange. The outer bearing ring is not divided and serves for fastening at the wheel carrier. The inner bearing ring exhibits recesses emanating from a front side in which a joint part of a constant velocity universal joint for driving the wheel flange is located in a positively locking manner.

The one-piece embodiment is disadvantageous insofar as the two bearing rows spaced from each other can only partially be filled with bearing balls. The quantity of the bearing balls, however, essentially determines the load-carrying ability of the bearing. As a rule, only a filling ratio of about 50% is achievable. After introducing the balls, these must subsequently be distributed across the circumference and must be inserted into their retaining cage. Such a cage is complicated and requires a certain flexibility for the ball insertion process.

In this selected constructional form, there is the additional disadvantage that the attachment of the universal joint requires an axial lengthening of the inner bearing ring and additional safety means. In the case of damage to the bearing, the inner ring must be replaced together with the outer ring requiring that the complete bearing arrangement, as such, must be replaced. (DE-PS No. 304 185)

In order to avoid the disadvantage of a only partial filling capacity of the bearing with bearing balls, it is also known to design the inner bearing ring as a separate component from the hub portion carrying the wheel flange, which hub portion also serves for connection with the joint part of a constant velocity universal joint. Herein, two inner bearing rings which have to be separately fabricated can be provided, but it can also be provided that one race, i.e., one inner race, is directly assigned to the hub and only the second ring which comprises the other race is designed as a separate component. The disadvantage of such a version is that an increased fabrication cost for producing the bearing components is involved, because the outer face of the wheel hub must be provided with an appropriate seating face.

Additionally, the wheel hub must also have a certain material thickness or strength in order to be able to transmit torque to which it is exposed. Furthermore, the separate inner bearing rings must also exhibit a certain minimum thickness or strength so that they do not warp during production stages or in the course of subsequent installation. Such a warping would result in nonuniform load-carrying conditions of the bearing arrangement. This would mean shortening the useful life of the bearing. (DE-OS No. 30 42 449)

The fabrication in common of bearing rings of two-row annular contact ball bearings is known as such, wherein after fabrication, the outer and inner bearing rings are again divided by a rupturing or fissure by the application of radial pressure. In such bearings, such as, for instance, that shown in U.S. Pat. No. 3,672,737 specialized retaining elements are however necessary in order to maintain the bearing rings at a precise distance from each other. This occurs in the shape of deformed sheet metal retaining rings. Such bearing arrangements, however, are utilizable only to a limited extent for the carriage of radial-axial loads, particularly when off-center radial forces are applied, so that tilting moments act upon the bearing arrangement. The divided inner bearing rings can indeed execute displacement with respect to each other to a limited extent. A precise fabrication of the components receiving them is therefore required.

SUMMARY OF THE INVENTION

Proceeding from this, the present invention is directed toward creating a bearing arrangement for the driven wheels of a motor vehicle with bearing rings which exhibit as high a load-carrying capacity as possible when referring to the diameter, and, thus, a small mass, and in which no additional measures concerning the connection of the universal joint and the wheel bearing for torque transmission are required.

In accordance with the invention, the inner bearing ring is first fabricated in one piece and dimensioned so as to be ready for installation and is subsequently divided into two parts by application of pressure through rupture or fission so that the split or fissure therebetween is arranged in the region between two races of the two inner ring parts. Recess means are provided as a means for fastening to a universal joint part into which engages corresponding protrusions of the joint part and the split or fissure is formed to extend through the recess means and with both inner ring parts being clamped against each other in the assembled state.

An advantage of the invention is that the inner bearing ring can be finish-fabricated to begin with and that no warping, particularly during heat treatment, occurs because of its radial thickness. Thus, a high machining accuracy can be observed which has a favorable effect on the useful life of the bearing. In addition, fewer fitted surfaces are required, and, thus, an economic design of the inner ring is possible. By the selected method of dividing the inner bearing ring by fissure, it is additionally achieved that the two parts thus formed can be installed only in a very specific position with respect to each other because of their surface structure. This surface structure furthermore ensures that the absorption of any tilting moment is easily possible without negative effects which can result in a centering operation. Also, nonuniform loading of the individual bearing rows is prevented. A further advantage is that the recesses for receiving the attachment of the joint part of the constant speed universal joint are simultaneously exposed by the rupturing process for the insertion or installation of the protrusions of the joint part.

Furthermore, a more compact construction of the bearing is achieved by the split-arrangement because the individual bearing rows can be filled to a higher degree, i.e., more balls can be accommodated across the circumference of the bearing than is usually the case in unsplit versions. A filling ratio of nearly 100% can be achieved. In addition, simplification of the cages for the ball bearing results so that completely normal axial installation can occur. The assembly of the two inner bearing parts by a bolt connection simultaneously produces axial retention and a torque transmitting connection between the inner bearing ring and the wheel flange, on the one hand, and the universal joint on the other, into which torque is introduced through the drive shaft.

A particularly favorable shaping and introduction of the moments result if the split intersects the bearing axis at an angle other than 90°. Thus, two conical faces are formed, including an external conical face and a hollow conical face, which interengage in the assembled state. As a result, the split extends obliquely in the region of the recesses so that it intersects the torque transmission plane and no circumferential forces arise which act upon the split.

In order to achieve a defined course of the split, the inner bearing ring is formed with notches prior to the splitting process to insure a correctly oriented splitting. Preferably, annularly extending notches are fabricated for this purpose upon the external surface and upon the inner surface of the inner bearing ring. If an oblique orientation for the split is to be achieved, the notches are arranged to be axially offset with respect to each other in the direction of the bearing axis.

The two inner ring parts formed by the split define bores aligned with each other for receiving connecting bolts for the purpose of connecting the two parts together. The bore of one of the annular parts can be designed to be a threaded bore, and the other as a throughbore. It is, however, also possible to design both bores as throughbores and to slide a bolt through both bores and to arrange a clamping nut at one end.

The use of such a bearing arrangement is essentially favorable if a constant velocity universal joint is selected which is designed as a tripot joint. Such a joint includes a joint part which comprises three cylindrical trunnions emanating from a central portion equidistantly across the circumference. Rollers are arranged upon the trunnions so as to be rotatably and axially displaceable. The rollers themselves are again guided in tracks of the other joint part and the other joint part is connected with a drive shaft for introducing torque. The three trunnions (or spider) of the first joint part are received in three corresponding recesses of the inner bearing ring.

It is, however, also possible to provide for other species of joints, wherein one of the joint parts comprises radially projecting extensions corresponding to the trunnions of a tripot joint. It is by no means required that the trunnions be cylindrical and other shapes can be provided. It is only important that the shaping be selected so that circumferential forces can be transmitted and axial retention assured.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there is illustrated and described a preferred embodiment of the invention.

DETAILED DESCRIPTION OF THE PREFERRED EMBODIMENT

Figure 1:
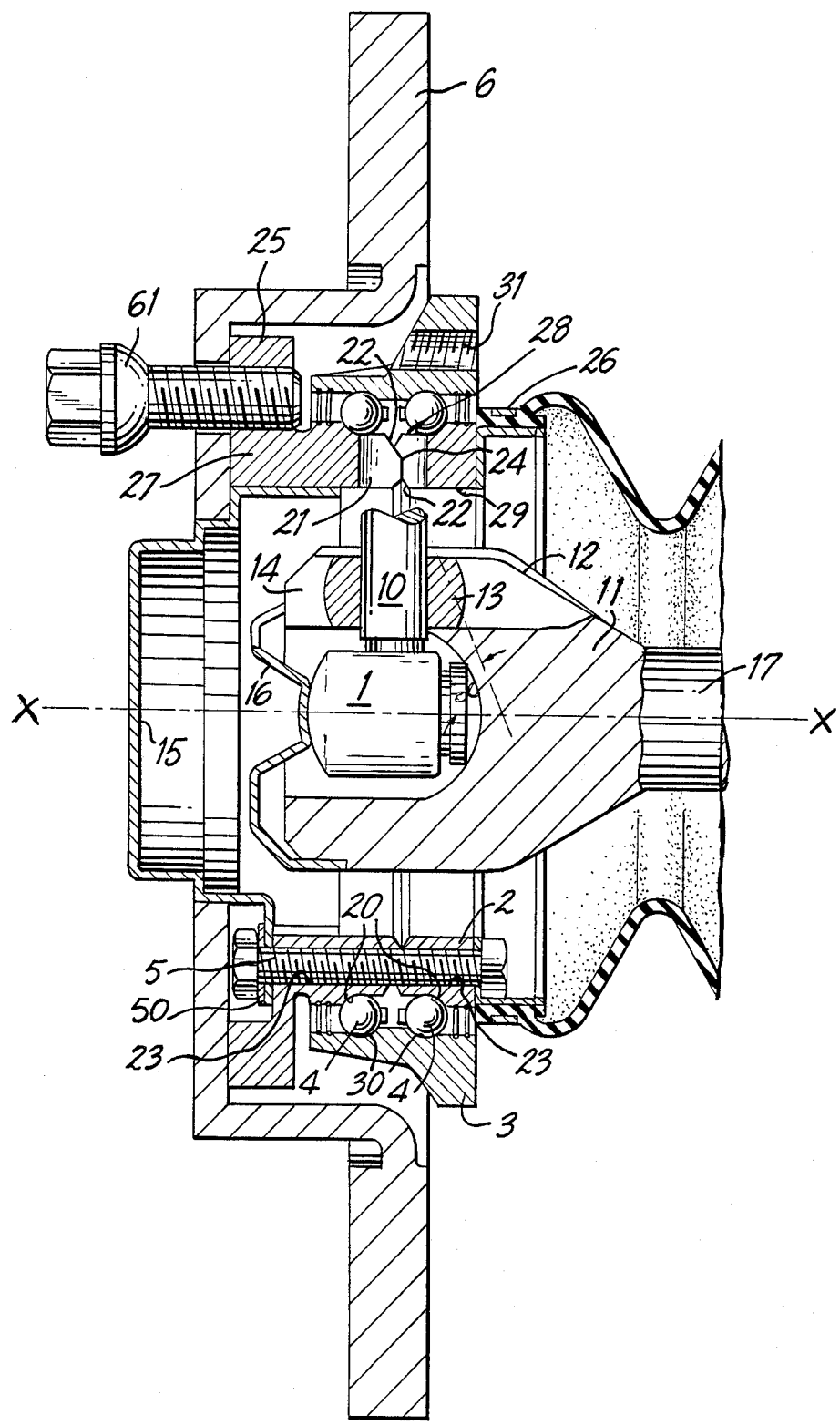
FIG. 1 is a sectional view of a bearing assembly in accordance with the invention.

Referring now to FIG. 1, there is shown a bearing arrangement in accordance with the invention comprising an outer bearing ring 3, an inner bearing ring 2 arranged concentrically thereto, roller members in the form of balls 4 arranged between said two rings as well as a constant velocity universal joint consisting of a first inner joint part 1 and a second outer joint part 11.

The outer bearing ring 3 has either a flange-shaped widening or extensions which are equipped with bores 31 for attachment at the wheel carrier of a motor vehicle. The inner bearing ring 2 is formed with an integral wheel flange 25 which serves for attachment of a brake disk 6 and for fastening of a vehicle wheel by means of attachment screws 61. The inner bearing ring 2 has therethrough a bore defined by an inner surface 29. The bore is closed off on one side by a cap 15 with the other side thereof being sealed by means of a boot which is connected to the inner bearing ring on one side and to the drive shaft 17 on its opposite side in a sealing manner.

The outer bearing ring 3 is not split and defines races 30 which are arranged to be axially spaced from each other. The races 30 are configured in such a way that they open outwardly or oppositely from each other so that an annular shoulder-shaped elevation is formed therebetween. Bearing balls 4 are guided in a rolling manner in the races 30, with the balls 4 being retained in cages (not shown). The races 30 lie diagonally opposite races 20 which are defined in the inner bearing ring 2.

The inner bearing ring 2 is initially fabricated in one piece and formed with both races 20. This fabrication is performed in such a manner that the final dimensions required for the assembly of the bearing arrangement are attained during the fabrication process and the inner bearing ring 2 is equipped with a notch 22 extending across its circumference and emanating from its external surface 28. Additionally, the inner bearing ring is provided with an annular notch 22 in its inner surface 29 extending across the circumference of this inner surface. The two annular notches 22 in the outer surface 28 and the inner surface 29 are axially offset with respect to each other, but they can however also lie in the same plane.

After fabrication of the inner bearing ring 2 is completed, especially after a hardening process has been performed, radial pressure is applied to the bearing ring 2 and indeed particularly in the region of notches 22. The pressure applied is of such an order of magnitude that the inner bearing ring 2 is split, ruptured or fissured into two inner bearing ring parts 26 and 27 with a split 24 extending from the notch 22 applied to the external surface 28 to the notch 22 applied to the inner surface 29. The split 24 is irregular and permits assembly of the two ring parts 26 and 27 only in a very specific position, namely that position in which they were originally connected with each other when formed in one piece.

Because of this irregular structure, an intimate connection between the two inner bearing ring parts 26 and 27 is possible. For a connection with the joint part 1 of the tripod joint in such a manner that they form one piece and rotate together, cylindrical bores 21 are arranged in the region of the split 24 corresponding to the arrangement of the trunnions 10 of the bearing part 1. Because of the splitting resulting from the rupturing process, the trunnions 10 can be assembled axially. Axial assembly of the bearing balls 4 is also possible. For instance, the bearing balls can be preassembled so as to be retained in the cage. Thus, they may, for example, first be inserted in the race 20 on the inner bearing ring portion 27 which is joined with the flange 25. Subsequently, there may be effected sliding on of the outer bearing ring independently of the first joint portion 1 with the trunnions 10 into the corresponding recesses 21 and finally the axial assembly of the second row of balls 4 with the cage and of the second inner bearing ring portion 26. Subsequently, the two inner bearing ring portions 27 and 26 are clamped against each other. Thus, there is simultaneously achieved a rotationally rigid connection between the joint portion 1 and the inner bearing ring 2 and thus with the wheel flange 25 for the purpose of driving the vehicle wheel. Furthermore, seals are arranged between the outer bearing ring 3 and the inner bearing ring 2 with one of the seals being first inserted during the installation sequence and another seal being inserted subsequently. The inner bearing ring 2 is formed with attachment bores 23 which extend through both inner bearing ring portions 26 and 27. Connecting bolts 5 are inserted into these bores and a nut of the connecting bolt 5 is prevented from loosening by a lock washer 50.

Figure 2:
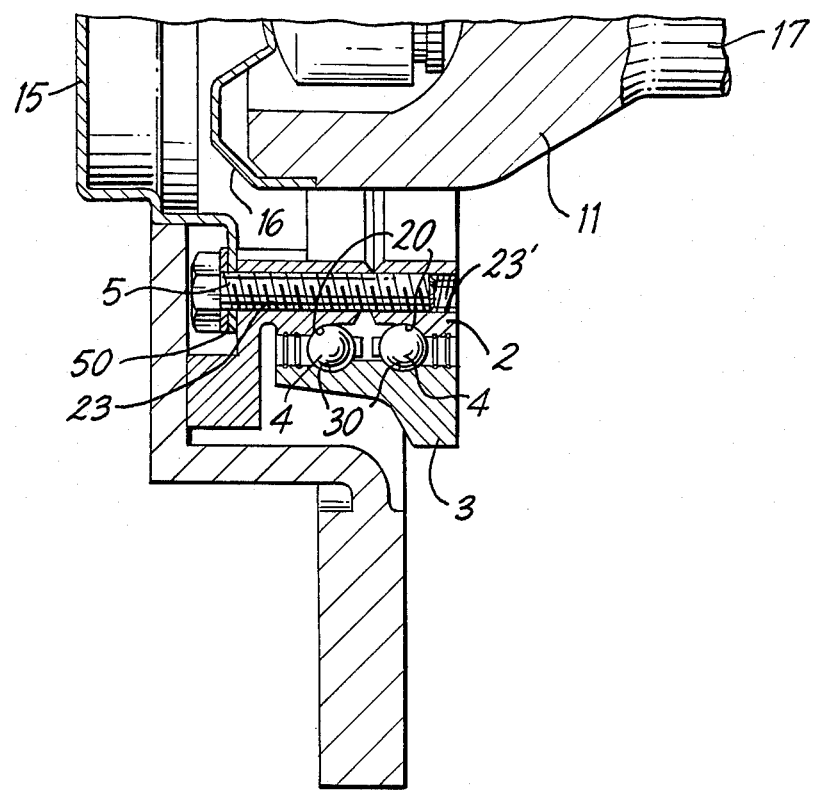
FIG. 2 is a partial view similar to FIG. 1 showing another embodiment of the invention.

The embodiment of FIG. 2 differs from that of FIG. 1 only in that in FIG. 2 one of the bearing ring portions has a threaded bore 23' for bolt 5.

The constant velocity universal joint is designed as a tripot constant velocity universal joint in the present example. The first joint part 1 is formed with trunnions 10 which protrude radially from a central portion thereof. Three trunnions 10 are distributed across the circumference of the part 1. Rollers 13 having a cylindrical bore are supported upon the trunnions 10 to be axially displaceable as well as rotatable. These rollers 13 have a spherical external contour and they are located with this contour in correspondingly designed tracks 14 of the second joint part 11. The tracks are formed in the shape of a fork 12 with three fork arms distributed across the circumference and the track pairs 14 arranged therebetween. The second joint part 11 is integrally formed with the drive shaft 17 to be rotative therewith.

Furthermore, a retaining spring 16 is provided which effects an axially fixed connection between the first joint part 1 and the second joint part 11. It will therefore be seen that the joint permits only angular motion, but no axial motion.

Utilization of a constant velocity universal joint of other joint types is also possible, wherein respectively one of the joint parts however must have extensions or projections on its external contour which engage into corresponding recesses of the inner bearing ring 2. The extensions and recesses are matched to each other. In any case, the arrangement must be formed in such a manner that the split in the region of these recesses extends from the outer surface 28 of the inner bearing ring 2 to the inner surface 29. Thus, splitting occurs in the region of these recesses 21.

It will thus be seen that the invention is directed to a bearing arrangement wherein the inner bearing ring 2 is fabricated initially in one piece and is subsequently ruptured to form the split 24 arranged between the two races of the inner bearing ring 2, whereby the ring 2 is formed into two bearing parts 26, 27 and wherein there are simultaneously formed attachment recesses 21 for receiving trunnions 10 of the first joint part 1 of a constant velocity universal joint. By means of this design, there is advantageously achieved a compact construction for the support itself because of an increase of the filling ratio with bearing balls 4, but also in a simple manner, there is also achieved at the same time a torque-carrying connection between the constant velocity universal joint through the inner bearing ring 2 with the wheel flange 25.

While a specific embodiment of the invention has been shown and described in detail to illustrate the application of the inventive principles, it will be understood that the invention may be embodied otherwise without departing from such principles.

What is claimed is:

1. A bearing assembly for the driven wheels of a motor vehicle comprising:
   wheel bearing arrangement including an inner bearing ring, an outer bearing ring and dual-row ball bearings interposed therebetween;
   a constant velocity universal joint in torque transmitting engagement with said wheel bearing arrangement;
   said inner bearing ring being formed with two races in two parts, each respectively defining one of said races for one of the rows of said dual-row ball bearings, one of said inner bearing ring parts being formed with flange means for connection thereto of a motor vehicle wheel;
   said inner bearing ring consisting essentially of a member initially fabricated in one piece with dimensions so as to be ready for installation in said bearing assembly and having been subsequently ruptured to form a split by the application of pressure, thereby to form said inner bearing ring into said two parts with said split being arranged between said two races; and
   recess means formed between said two parts of said inner bearing ring for engaging therein a part of said universal joint to effect said torque transmitting engagement;
   said two parts of said inner bearing ring being clamped together in an assembled state by clamping means, with said split therebetween extending through said recess means.

2. An assembly according to claim 1, wherein said split intersects an axis of said bearing assembly at an angle other than a right angle.

3. An assembly according to claim 1, wherein said inner bearing ring is formed with notches which are provided in said initially fabricated one piece member for directing the formation of said split during said rupturing.

4. An assembly according to claim 3, wherein said notches are arranged on an outer surface and on an inner surface of said inner bearing ring and are formed in an annular configuration.

5. An assembly according to claim 4, wherein said notches on said outer and said inner surfaces are offset axially with respect to each other.

6. An assembly according to claim 1, wherein said inner bearing ring is formed with bores extending through both of said parts thereof aligned with each other and distributed about the circumference thereof, said bores having connecting bolts which comprise said clamping means attached therethrough.

7. An assembly according to claim 6, wherein said bores include a threaded bore in one of two parts of said inner bearing ring and a throughbore in the other of said two parts.

8. An assembly according to claim 1, wherein said constant velocity universal joint comprises a tripot joint including an inner joint member having cylindrical trunnions each having an axis and each extending from a central portion thereof equally distributed about the circumference thereof with rollers arranged thereon so as to be rotationally displaceable about and axially displaceable along the respective trunnion axis, said rollers being guided in tracks of another part of said joint with said other part being connected with a drive shaft and with three of said trunnions being formed on said first joint part arranged to be received in said recess means, said recess means comprising three recesses corresponding with said trunnions.

* * * * *